(12) United States Patent
Tsai et al.

(10) Patent No.: US 8,068,290 B1
(45) Date of Patent: Nov. 29, 2011

(54) IMAGE PICK-UP OPTICAL LENS ASSEMBLY

(75) Inventors: Tsung Han Tsai, Taichung (TW); Hsin Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/032,669

(22) Filed: Feb. 23, 2011

(30) Foreign Application Priority Data

Nov. 19, 2010 (TW) ................. 99139905 A

(51) Int. Cl.
*G02B 9/34* (2006.01)
*G02B 3/02* (2006.01)
(52) U.S. Cl. ......... 359/773; 359/715; 359/771; 359/772
(58) Field of Classification Search .......... 359/715, 359/771, 772, 773, 778
See application file for complete search history.

(56) References Cited

U.S. PATENT DOCUMENTS

| | | | |
|---|---|---|---|
| 7,012,765 B2 * | 3/2006 | Matsui et al. | 359/771 |
| 7,145,736 B2 | 12/2006 | Noda | |
| 7,365,920 B2 | 4/2008 | Noda | |
| 7,755,853 B2 * | 7/2010 | Taniyama | 359/773 |

* cited by examiner

*Primary Examiner* — Jack Dinh
(74) *Attorney, Agent, or Firm* — Morris Manning & Martin LLP; Tim Tingkang Xia, Esq.

(57) ABSTRACT

This invention provides an image pick-up optical lens assembly comprising, in order from an object side to an image side: a first lens element with positive refractive power having a convex object-side surface and a convex image-side surface; a second lens element with negative refractive power having a concave object-side surface and a convex image-side surface; a third lens element with positive refractive power having an object-side surface and a convex image-side surface, at least one of the surfaces thereof being aspheric; and a fourth lens element with negative refractive power having a convex object-side surface and a concave image-side surface, at least one of the surfaces thereof being aspheric. The image pick-up optical lens assembly further comprises an aperture stop disposed between an object and the first lens element. Such arrangement facilitates a significant reduction in size and sensitivity of the lens assembly while providing superb image quality with higher resolution.

15 Claims, 14 Drawing Sheets

| TABLE 1 | | | | | | |
|---|---|---|---|---|---|---|
| (Embodiment 1) | | | | | | |
| f = 2.11 mm, Fno = 2.07, HFOV = 37.4 deg. | | | | | | |
| Surface # | | Curvature Radius | Thickness | Material | Index | Abbe # | Focal length |
| 0 | Object | Plano | Infinity | | | | |
| 1 | Ape. Stop | Plano | 0.201 | | | | |
| 2 | Lens 1 | 2.76418 (ASP) | 0.871 | Plastic | 1.544 | 55.9 | 1.60 |
| 3 | | -1.13452 (ASP) | 0.186 | | | | |
| 4 | Lens 2 | -0.82588 (ASP) | 0.300 | Plastic | 1.634 | 23.8 | -1.70 |
| 5 | | -3.99630 (ASP) | 0.035 | | | | |
| 6 | Lens 3 | -2.41711 (ASP) | 0.661 | Plastic | 1.530 | 55.8 | 2.06 |
| 7 | | -0.82327 (ASP) | 0.035 | | | | |
| 8 | Lens 4 | 0.96576 (ASP) | 0.402 | Plastic | 1.530 | 55.8 | -7.07 |
| 9 | | 0.65708 (ASP) | 0.700 | | | | |
| 10 | IR-filter | Plano | 0.300 | Glass | 1.517 | 64.2 | - |
| 11 | | Plano | 0.187 | | | | |
| 12 | Image | Plano | - | | | | |
| Note : Reference wavelength is d-line 587.6nm | | | | | | | |

Fig.4

| TABLE 2 | | | | |
|---|---|---|---|---|
| Aspheric Coefficients | | | | |
| Surface # | 2 | 3 | 4 | 5 |
| k = | -3.78600E+00 | -7.68324E-01 | -9.23987E-01 | -9.63443E+00 |
| A4 = | -6.51409E-02 | -1.44468E-01 | -1.56685E-01 | -1.63852E-01 |
| A6 = | -1.03519E-01 | 4.30231E-01 | 7.86547E-01 | 2.56736E-01 |
| A8 = | -9.03164E-02 | -1.09933E+00 | -1.07946E+00 | -1.74749E-01 |
| A10 = | 1.48333E-02 | 1.06731E+00 | 5.69476E-01 | 3.77628E-02 |
| A12 = | -7.36628E-01 | -5.05227E-01 | 3.06102E-04 | 4.32650E-03 |
| A14 = | -4.62567E-02 | -2.01915E-02 | | |
| Surface # | 6 | 7 | 8 | 9 |
| k = | -1.01313E+00 | -9.82862E-01 | -1.20843E+00 | -1.05165E+00 |
| A4 = | 7.28523E-02 | 1.58887E-01 | -3.37887E-01 | -8.36316E-01 |
| A6 = | -2.56712E-03 | 2.67670E-02 | 4.14175E-01 | 1.36507E+00 |
| A8 = | 6.82510E-02 | -2.76826E-02 | -5.11989E-01 | -1.83756E+00 |
| A10 = | -2.74525E-02 | 2.61202E-02 | 4.12055E-01 | 1.72532E+00 |
| A12 = | 4.63246E-03 | 7.17889E-03 | -2.19307E-01 | -1.10175E+00 |
| A14 = | | | 6.99696E-02 | 4.66191E-01 |
| A16 = | | | -1.05812E-02 | -1.24434E-01 |

Fig.5

| TABLE 3 | | | | | | | |
|---|---|---|---|---|---|---|---|
| (Embodiment 2) | | | | | | | |
| f = 2.12 mm, Fno = 2.07, HFOV= 36.9 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | 0.258 | | | | |
| 2 | Lens 1 | 2.35365 (ASP) | 0.969 | Plastic | 1.543 | 56.5 | 1.42 |
| 3 | | -0.98339 (ASP) | 0.077 | | | | |
| 4 | Lens 2 | -1.00640 (ASP) | 0.300 | Plastic | 1.650 | 21.4 | -1.61 |
| 5 | | -29.41180 (ASP) | 0.200 | | | | |
| 6 | Lens 3 | -2.15113 (ASP) | 0.556 | Plastic | 1.583 | 30.2 | 2.16 |
| 7 | | -0.86948 (ASP) | 0.035 | | | | |
| 8 | Lens 4 | 0.72274 (ASP) | 0.300 | Plastic | 1.543 | 56.5 | -5.83 |
| 9 | | 0.50241 (ASP) | 0.791 | | | | |
| 10 | IR-filter | Plano | 0.219 | Glass | 1.517 | 64.2 | - |
| 11 | | Plano | 0.155 | | | | |
| 12 | Image | Plano | - | | | | |
| Note : Reference wavelength is d-line 587.6nm | | | | | | | |

Fig.6

| TABLE 4 | | | | |
|---|---|---|---|---|
| Aspheric Coefficients | | | | |
| Surface # | 2 | 3 | 4 | 5 |
| k = | -1.00395E+00 | -1.24552E+00 | -1.23691E+00 | -9.00000E+01 |
| A4 = | -4.70852E-02 | -2.78532E-02 | -1.06217E-01 | -1.25559E-01 |
| A6 = | -5.43499E-02 | 5.20508E-01 | 8.06037E-01 | 2.38911E-01 |
| A8 = | -1.43546E-01 | -1.11482E+00 | -1.05710E+00 | -1.76233E-01 |
| A10 = | 3.23114E-01 | 9.98889E-01 | 5.65088E-01 | 3.91534E-02 |
| A12 = | -4.73372E-01 | -5.27185E-01 | -8.90435E-02 | 2.98134E-03 |
| A14 = | -2.24193E-01 | 8.47483E-02 | | |
| Surface # | 6 | 7 | 8 | 9 |
| k = | 6.02770E-01 | -8.95771E-01 | -1.75887E+00 | -1.32029E+00 |
| A4 = | 9.53777E-02 | 1.35896E-01 | -3.28832E-01 | -8.36716E-01 |
| A6 = | -7.33579E-03 | 2.65425E-02 | 4.03927E-01 | 1.41821E+00 |
| A8 = | 6.51762E-02 | -7.23231E-03 | -4.73837E-01 | -1.84382E+00 |
| A10 = | -2.76603E-02 | 3.72333E-02 | 4.08207E-01 | 1.71999E+00 |
| A12 = | 5.27521E-03 | -2.44596E-03 | -2.26594E-01 | -1.10163E+00 |
| A14 = | | | 6.90888E-02 | 4.66494E-01 |
| A16 = | | | -8.70556E-03 | -1.24278E-01 |

Fig.7

| TABLE 5 | | | | | | | |
|---|---|---|---|---|---|---|---|
| (Embodiment 3) | | | | | | | |
| f = 2.13 mm, Fno = 2.40, HFOV = 37.3 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | 0.000 | | | | |
| 2 | Lens 1 | 2.55966 (ASP) | 0.664 | Plastic | 1.544 | 55.9 | 1.56 |
| 3 | | -1.14879 (ASP) | 0.180 | | | | |
| 4 | Lens 2 | -0.92142 (ASP) | 0.433 | Plastic | 1.633 | 23.4 | -1.57 |
| 5 | | -15.64780 (ASP) | 0.048 | | | | |
| 6 | Lens 3 | -3.27060 (ASP) | 0.676 | Plastic | 1.530 | 55.8 | 1.85 |
| 7 | | -0.80965 (ASP) | 0.035 | | | | |
| 8 | Lens 4 | 1.01442(ASP) | 0.420 | Plastic | 1.530 | 55.8 | -5.12 |
| 9 | | 0.63246(ASP) | 0.500 | | | | |
| 10 | IR-filter | Plano | 0.300 | Glass | 1.517 | 64.2 | - |
| 11 | | Plano | 0.369 | | | | |
| 12 | Image | Plano | - | | | | |
| Note : Reference wavelength is d-line 587.6nm | | | | | | | |

Fig.8

| TABLE 6 | | | | |
|---|---|---|---|---|
| Aspheric Coefficients | | | | |
| Surface # | 2 | 3 | 4 | 5 |
| k  = | -5.59810E+00 | -1.00000E+00 | -1.00000E+00 | -1.00000E+00 |
| A4 = | -9.75299E-02 | -4.07119E-01 | -5.70438E-01 | -2.25639E-01 |
| A6 = | -5.93367E-01 | -4.86090E-02 | 2.45925E-01 | 2.89305E-01 |
| A8 = | 2.00002E+00 | -8.73407E-01 | 1.06516E-01 | -2.85462E-01 |
| A10 = | -9.61152E+00 | 2.49769E+00 | 2.82182E-01 | -6.32208E-04 |
| A12 = | -2.18714E-01 | -6.27065E+00 | -3.16331E+00 | 6.38010E-02 |
| A14 = | -4.62603E-02 | 1.35872E-01 | | |
| Surface # | 6 | 7 | 8 | 9 |
| k  = | -1.00000E+00 | -1.00000E+00 | -1.00000E+00 | -1.00000E+00 |
| A4 = | 4.99560E-02 | 3.38992E-02 | -5.88384E-01 | -1.07848E+00 |
| A6 = | 4.42919E-03 | 7.98807E-02 | 5.69087E-01 | 1.53844E+00 |
| A8 = | 1.20790E-01 | 2.75815E-02 | -5.25887E-01 | -1.89035E+00 |
| A10 = | -3.19589E-03 | 7.13896E-02 | 3.95889E-01 | 1.72419E+00 |
| A12 = | -2.05625E-02 | 2.68682E-02 | -2.24045E-01 | -1.10003E+00 |
| A14= | | | 6.96999E-02 | 4.66733E-01 |
| A16= | | | -8.12362E-03 | -1.24467E-01 |
| A18= | | | | 1.87597E-02 |
| A20= | | | | -1.21205E-03 |

Fig.9

| TABLE 7 | | | |
|---|---|---|---|
| | Embodiment 1 | Embodiment 2 | Embodiment 3 |
| f | 2.11 | 2.12 | 2.13 |
| Fno | 2.07 | 2.07 | 2.40 |
| HFOV | 37.4 | 36.9 | 37.3 |
| V1-V2 | 32.1 | 35.1 | 32.5 |
| \|N1-N2\| | 0.090 | 0.107 | 0.089 |
| R2/R3 | 1.37 | 0.98 | 1.25 |
| (R1+R2)/(R1-R2) | 0.42 | 0.41 | 0.38 |
| (R3+R4)/(R3-R4) | -1.52 | -1.07 | -1.13 |
| f1/f2 | -0.94 | -0.88 | -0.99 |
| f2/f4 | 0.24 | 0.28 | 0.31 |
| T12/f | 0.09 | 0.04 | 0.08 |
| $\dfrac{(f/f_2)+(f/f_3)}{f/f_4}$ | 0.73 | 0.92 | 0.49 |
| $\dfrac{\sum CT}{Td}$ | 0.90 | 0.87 | 0.89 |
| Y11/Y42 | 0.49 | 0.51 | 0.34 |
| SL/TTL | 1.06 | 1.07 | 1.00 |
| TTL/ImgH | 2.21 | 2.18 | 2.18 |

Fig.10

IMAGE PICK-UP OPTICAL LENS ASSEMBLY

CROSS-REFERENCE TO RELATED APPLICATIONS

This non-provisional application claims priority under 35 U.S.C. §119(a) on Patent Application No(s). 099139905 filed in Taiwan, R.O.C. on Nov. 19, 2010, the entire contents of which are hereby incorporated by reference.

BACKGROUND OF THE INVENTION

1. Field of the Invention

The present invention relates to an image pick-up optical lens assembly, and more particularly, to an image pick-up optical lens assembly used in electronic products.

2. Description of the Prior Art

The demand for compact imaging lens elements has grown in recent years as the popularity of portable electronic products with the photographing function has increased, and the sensor of a general imaging lens is none other than CCD (Charge Coupled Device) or CMOS (Complementary Metal-Oxide Semiconductor Sensor). Furthermore, as advances in semiconductor manufacturing technology have allowed the pixel size of sensors to be reduced, and the resolution of compact imaging lens elements has gradually increased, there is an increasing demand for compact imaging lens elements featuring better image quality.

Generally, the conventional imaging lens for portable electronic products, such as the one disclosed in U.S. Pat. No. 7,145,736, is of a triplet type comprising, in order from the object side to the image side: a first lens element with positive refractive power; a second lens element with negative refractive power; and a third lens element with positive refractive power. However, as advances in semiconductor manufacturing technology will never stop while electronic products are becoming even more compact at the same time, the pixel size of sensors will become even smaller, and the standard for image quality becomes even higher. Therefore, the three-element lens assembly has become insufficient for a high-end imaging lens module. U.S. Pat. No. 7,365,920 has disclosed a four-lens-element assembly, wherein two spherical-surface glass lens elements serving as the first and second lens elements are adhered together to form a doublet for correcting the chromatic aberration. Such an arrangement of optical elements, however, has the following disadvantages: (1) the degree of freedom of the optical system is curtailed due to the employment of excess number of spherical-surface glass lens elements, thus the total track length of the optical system cannot be reduced easily; (2) the process of adhering glass lens elements together is complicated, posing difficulties in the production process.

Therefore, a need exists in the art for an image pick-up optical lens assembly that features better image quality, higher resolution and compact size and is applicable to compact portable electronic products.

SUMMARY OF THE INVENTION

The present invention provides an image pick-up optical lens assembly comprising, in order from an object side to an image side: a first lens element with positive refractive power having a convex object-side surface and a convex image-side surface; a second lens element with negative refractive power having a concave object-side surface and a convex image-side surface; a third lens element with positive refractive power having an object-side surface and a convex image-side surface, at least one of the surfaces thereof being aspheric; and a fourth lens element with negative refractive power having a convex object-side surface and a concave image-side surface, at least one of the surfaces thereof being aspheric; wherein the image pick-up optical lens assembly further comprises an aperture stop disposed between an object and the first lens element; wherein the number of lens elements with refractive power is four; and wherein a combined thickness of the lens elements with refractive power on an optical axis is ΣCT, a distance on the optical axis between the object-side surface of the first lens element and the image-side surface of the fourth lens element is Td, a radius of curvature of the object-side surface of the first lens element is R1, a radius of curvature of the image-side surface of the first lens element is R2, a focal length of the image pick-up optical lens assembly is f, a focal length of the second lens element is f2, a focal length of the third lens element is f3, a focal length of the fourth lens element is f4, a distance on the optical axis between the first lens element and the second lens element is T12, and they satisfy the relations:

$$0.80 < \frac{\Sigma CT}{Td} < 0.98;\ 0.15 < (R1+R2)/(R1-R2) < 1.0;$$

$$0.4 < \frac{(f/f_2)+(f/f_3)}{f/f_4} < 1.7;\ \text{and}\ 0.0 < T12/f < 0.10.$$

Such arrangement facilitates a significant reduction in the size and sensitivity of the lens assembly and enables the lens assembly to obtain a higher resolution.

In the present image pick-up optical lens assembly, the first lens element with positive refractive power provides a part of the refractive power for the optical system so that the total track length of the image pick-up optical lens assembly can be favorably reduced; the second lens element has negative refractive power so that the aberration generated by the first lens element with positive refractive power and the chromatic aberration of the optical system can be favorably corrected; the third lens element has positive refractive power so that the refractive power of the image pick-up optical lens assembly can be favorably distributed, thereby facilitating the attenuation of the sensitivity of the optical system; the fourth lens element has negative refractive power so that the principal point of the optical system can be positioned away from the image plane, thereby the total track length of the optical system can be favorably reduced to keep the lens assembly compact.

In the present image pick-up optical lens assembly, the first lens element is a bi-convex lens element having a convex object-side surface and a convex image-side surface so that the positive refractive power thereof can be effectively enhanced, thereby reducing the total track length of the optical system. The second lens element is a meniscus lens element having a concave object-side surface and a convex image-side surface so that the astigmatism of the optical system can be favorably corrected, thereby facilitating the improvement of the image quality. The third lens element has a convex image-side surface so that the total track length can be further reduced and the refractive power of the first lens element can be favorably distributed to attenuate the sensitivity of the optical system. The fourth lens element is a meniscus lens element having a convex object-side surface and a concave image-side surface so that the astigmatism and high order aberrations of the optical system can be favorably corrected.

In the present image pick-up optical lens assembly, the aperture stop may be disposed between the object and the first lens element. The first lens element provides positive refractive power, and the aperture stop is disposed near the object side of the image pick-up optical lens assembly, thereby the total track length of the image pick-up optical lens assembly can be effectively reduced. The aforementioned arrangement also enables the exit pupil of the image pick-up optical lens assembly to be positioned far away from the image plane, thus light will be projected onto the image sensor at a nearly perpendicular angle, and this is the telecentric feature of the image side. The telecentric feature is very important to the photosensitive power of the solid-state sensor as it can improve the photosensitivity of the sensor to reduce the occurrence of shading. Moreover, the fourth lens element may include at least one inflection point so as to reduce the angle of the incident light projected onto the sensor from the off-axis field effectively. Accordingly, the off-axis aberration can be further corrected.

BRIEF DESCRIPTION OF THE DRAWINGS

FIG. 4 is TABLE 1 which lists the optical data of the first embodiment.

FIG. 5 is TABLE 2 which lists the aspheric surface data of the first embodiment.

FIG. 6 is TABLE 3 which lists the optical data of the second embodiment.

FIG. 7 is TABLE 4 which lists the aspheric surface data of the second embodiment.

FIG. 8 is TABLE 5 which lists the optical data of the third embodiment.

FIG. 9 is TABLE 6 which lists the aspheric surface data of the third embodiment.

FIG. 10 is TABLE 7 which lists the data from the equations in accordance with the first, second and third embodiments.

DETAILED DESCRIPTION OF THE PREFERRED EMBODIMENTS

Figure 1A:
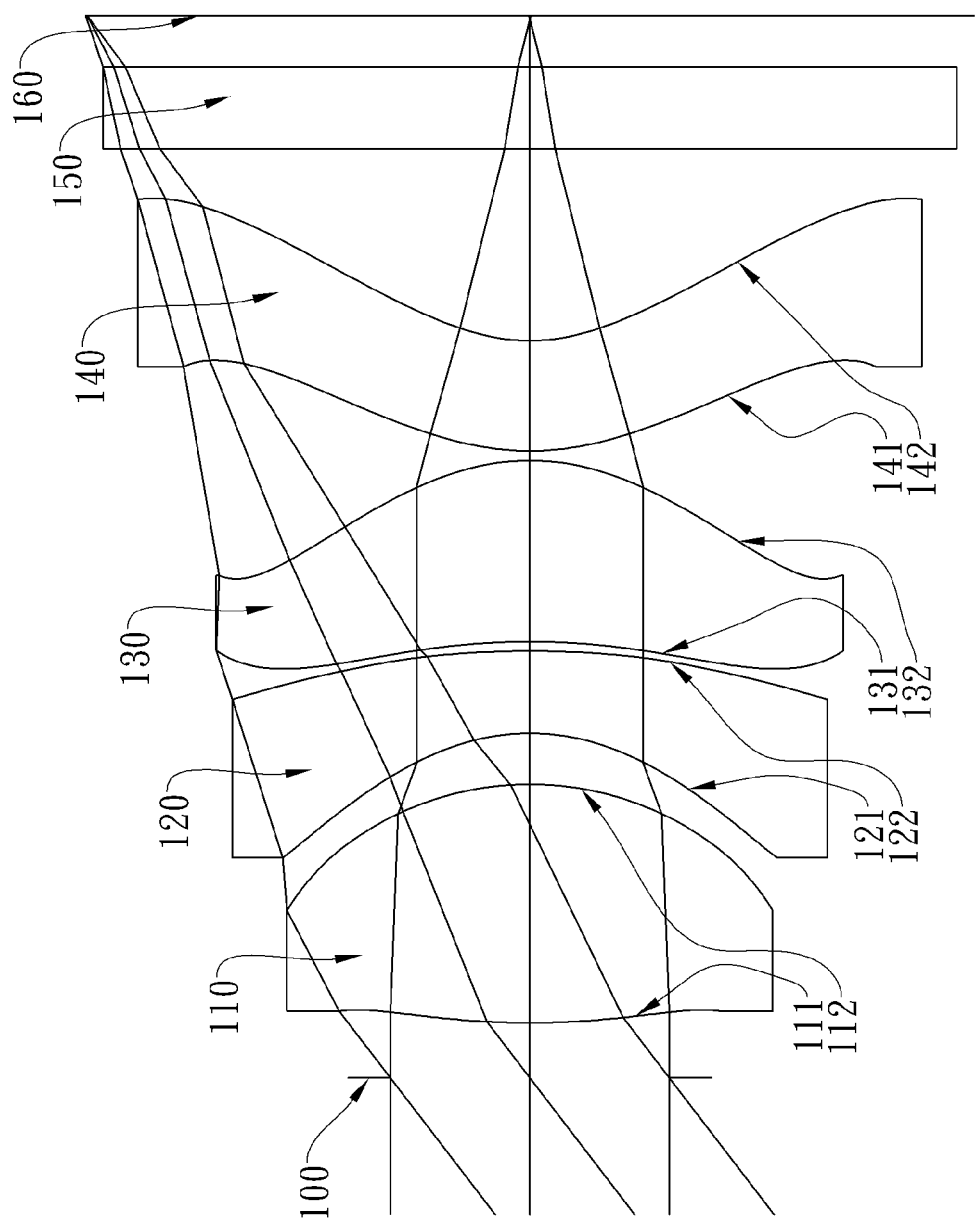
FIG. 1A shows an image pick-up optical lens assembly in accordance with a first embodiment of the present invention.

The present invention provides an image pick-up optical lens assembly comprising, in order from an object side to an image side: a first lens element with positive refractive power having a convex object-side surface and a convex image-side surface; a second lens element with negative refractive power having a concave object-side surface and a convex image-side surface; a third lens element with positive refractive power having an object-side surface and a convex image-side surface, at least one of the surfaces thereof being aspheric; and a fourth lens element with negative refractive power having a convex object-side surface and a concave image-side surface, at least one of the surfaces thereof being aspheric; wherein the image pick-up optical lens assembly further comprises an aperture stop disposed between an object and the first lens element; wherein the number of lens elements with refractive power is four; and wherein a combined thickness of the lens elements with refractive power on an optical axis is $\Sigma CT$, a distance on the optical axis between the object-side surface of the first lens element and the image-side surface of the fourth lens element is Td, a radius of curvature of the object-side surface of the first lens element is R1, a radius of curvature of the image-side surface of the first lens element is R2, a focal length of the image pick-up optical lens assembly is f, a focal length of the second lens element is f2, a focal length of the third lens element is f3, a focal length of the fourth lens element is f4, a distance on the optical axis between the first lens element and the second lens element is T12, and they satisfy the relations:

$$0.80 < \frac{\Sigma CT}{Td} < 0.98; \; 0.15 < (R1+R2)/(R1-R2) < 1.0;$$

$$0.4 < \frac{(f/f_2)+(f/f_3)}{f/f_4} < 1.7; \; \text{and} \; 0.0 < T12/f < 0.10.$$

When the relation of $$0.80 < \frac{\Sigma CT}{Td} < 0.98$$

is satisfied, the thickness of each lens element in the image pick-up optical lens assembly is more appropriate for the manufacturing and assembly of the lens elements. Preferably, $\Sigma CT$ and Td satisfy the relation:

$$0.86 < \frac{\Sigma CT}{Td} < 0.94.$$

When the relation of 0.15<(R1+R2)/(R1−R2)<1.0 is satisfied, the curvature of the first lens element is more appropriate, thereby the total track length can be effectively reduced and the spherical aberration can be prevented from becoming too large. Preferably, R1 and R2 satisfy the relation: 0.3<(R1+R2)/(R1−R2)<0.5. When the relation of $$0.4 < \frac{(f/f_2)+(f/f_3)}{f/f_4} < 1.7$$

is satisfied, the refractive power of the fourth lens element is more appropriate, thereby the high order aberrations of the optical system can be favorably corrected. Preferably, f, f2, f3 and f4 satisfy the relation:

$$0.5 < \frac{(f/f_2)+(f/f_3)}{f/f_4} < 1.2.$$

When the relation of 0.0<T12/f<0.10 is satisfied, the distance on the optical axis between the first lens element and the second lens element is more appropriate, thereby the total track length of the optical system can be effectively reduced.

In the aforementioned image pick-up optical lens assembly, it is preferable that the fourth lens element is provided with at least one inflection point so that the angle of the incident light is projected onto the sensor from the off-axis field can be reduced effectively. Accordingly, the off-axis aberration can be further corrected. Preferably, the fourth lens element is made of plastic material. The employment of plastic lens elements facilitates a significant reduction in the weight and production cost of the lens assembly.

In the aforementioned image pick-up optical lens assembly, it is preferable that the object-side surface of the third lens element is concave so that the astigmatism and high order aberrations of the optical system can be favorably corrected.

The aforementioned image pick-up optical lens assembly is further provided with an image plane for image formation of an object. The distance on the optical axis between the aperture stop and the image plane is SL, the distance on the optical axis between the object-side surface of the first lens element and the image plane is TTL, and they preferably satisfy the relation: $0.90 < SL/TTL < 1.20$. When the above relation is satisfied, the location of the aperture stop enables the optical system to obtain the telecentricity, thereby improving the image quality.

In the aforementioned image pick-up optical lens assembly, the radius of curvature of the object-side surface of the second lens element is R3, the radius of curvature of the image-side surface of the second lens element is R4, and they preferably satisfy the relation: $-2.0 < (R3+R4)/(R3-R4) < -1.0$. When the above relation is satisfied, the difficulty during the lens fabrication process caused by excessively large curvature of the second lens element can be avoided.

In the aforementioned image pick-up optical lens assembly, the focal length of the first lens element is f1, the focal length of the second lens element is f2, and they preferably satisfy the relation: $-1.2 < f1/f2 < -0.8$. When the above relation is satisfied, the refractive power of the first lens element and the second lens element is more appropriate, thereby the aberration of the optical system can be effectively corrected.

In the aforementioned image pick-up optical lens assembly, the focal length of the second lens element is f2, the focal length of the fourth lens element is f4, and they preferably satisfy the relation: $0.15 < f2/f4 < 0.45$. When the above relation is satisfied, the negative refractive power of the optical system can be distributed more appropriately, thereby the image quality can be favorably improved and the sensitivity of the optical system can be prevented from becoming too high.

In the aforementioned image pick-up optical lens assembly, the refractive index of the first lens element is N1, the refractive index of the second lens element is N2, and they preferably satisfy the relation: $|N1-N2| < 0.12$. When the above relation is satisfied, the image pick-up optical lens assembly can correct the astigmatism much more effectively.

In the aforementioned image pick-up optical lens assembly, the effective radius of the object-side surface of the first lens element is Y11, the effective radius of the image-side surface of the fourth lens element is Y42, and they preferably satisfy the relation: $0.4 < Y11/Y42 < 0.7$. When the above relation is satisfied, the size of the entrance and exit pupils will be more appropriate, thereby the amount of unwanted light entering the optical system can be effectively controlled to improve the image quality.

In the aforementioned image pick-up optical lens assembly, the Abbe number of the first lens element is V1, the Abbe number of the second lens element is V2, and they preferably satisfy the relation: $30 < V1-V2 < 45$. When the above relation is satisfied, the chromatic aberration of the image pick-up optical lens assembly can be favorably corrected.

In the aforementioned image pick-up optical lens assembly, the radius of curvature of the image-side surface of the first lens element is R2, the radius of curvature of the object-side surface of the second lens element is R3, and they preferably satisfy the relation: $0.85 < R2/R3 < 1.45$. When the above relation is satisfied, the curvatures of the image-side surface of the first lens element and the object-side surface of the second lens element are more appropriate, thereby the aberration of the optical system can be favorably corrected and the lens elements of the optical system can be assembled more effectively.

The aforementioned image pick-up optical lens assembly further comprises an image sensor disposed on the image plane. The distance on the optical axis between the object-side surface of the first lens element and the image plane is TTL, half of the diagonal length of the effective photo-sensitive area of the image sensor is ImgH, and they preferably satisfy the relation: $TTL/ImgH < 2.4$. The satisfaction of the above relation enables the image pick-up optical lens assembly to maintain a compact form so that it can be installed in compact portable electronic products.

In the present image pick-up optical lens assembly, the lens elements can be made of glass or plastic material. If the lens elements are made of glass, there is more freedom in distributing the refractive power of the optical system. If plastic material is adopted to produce the lens elements, the production cost will be reduced significantly. Additionally, the surfaces of the lens elements can be aspheric and easily made into non-spherical profiles, allowing more design parameter freedom which can be used to eliminate the aberration and thereby to further reduce the number of the lens elements in the optical system. Consequently, the total track length of the image pick-up optical lens assembly can be effectively reduced.

In the present image pick-up optical lens assembly, if a lens element has a convex surface, it means the portion of the surface in proximity to the optical axis is convex; if a lens element has a concave surface, it means the portion of the surface in proximity to the optical axis is concave.

The present image pick-up optical lens assembly can be provided with at least one stop, such as a flare stop, to reduce the amount of unwanted light, thereby the image quality can be favorably improved.

Figure 11:
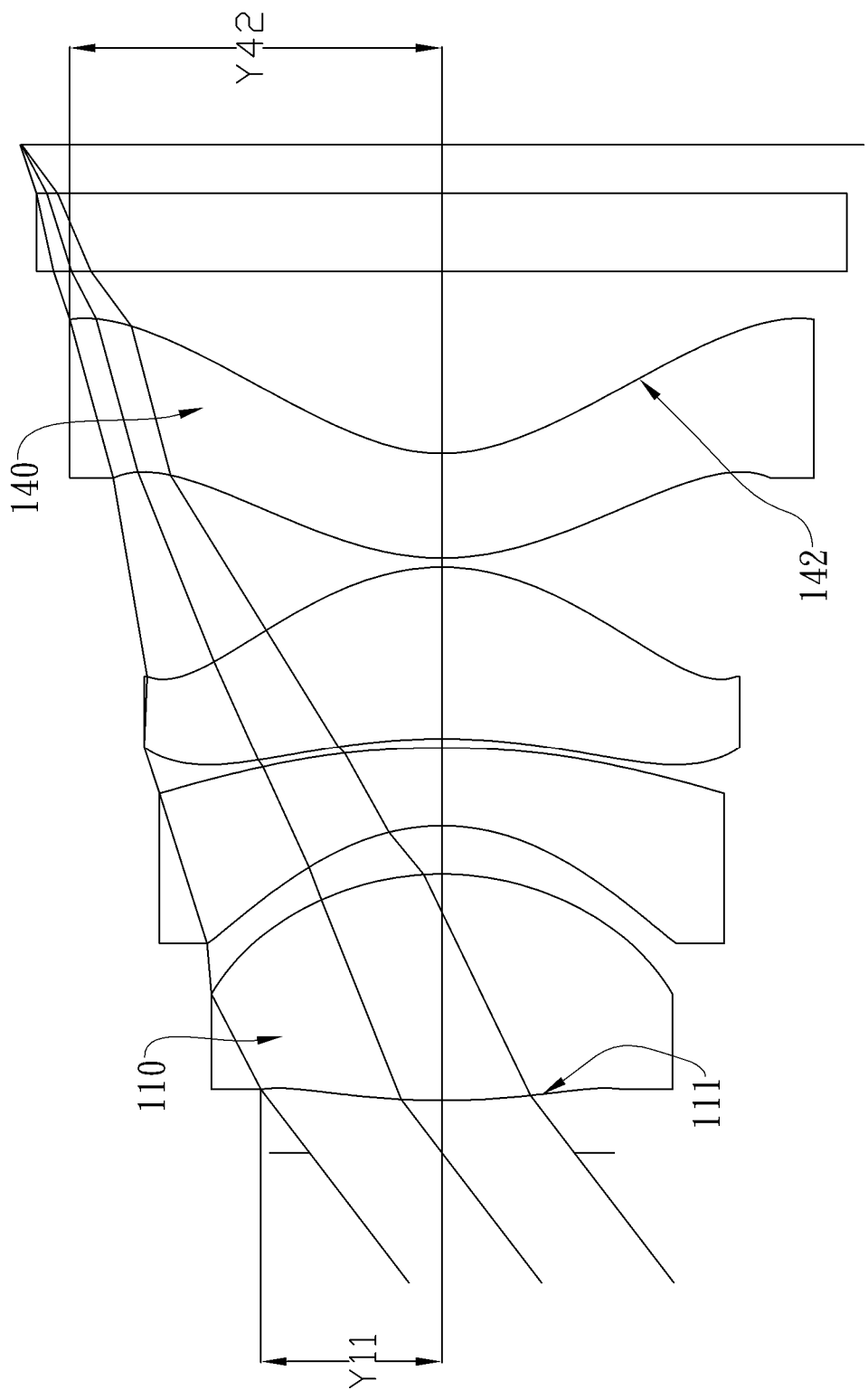
FIG. 11 shows the distances and relative locations represented by Y11 and Y42.

In present image pick-up optical lens assembly, the effective radius of the object-side surface of the first lens element is Y11, and the effective radius of the image-side surface of the fourth lens element is Y42. The distances and relative locations represented by Y11 and Y42 will be further illustrated in FIG. 11. FIG. 11 is a schematic representation illustrating an image pick-up optical lens assembly in accordance with a first embodiment of the present invention. The vertical distance between the farthest point of the effective light entry area on the object-side surface 111 of the first lens element 110 and the optical axis is Y11, and the vertical distance between the farthest point of the effective light entry area on the image-side surface 142 of the fourth lens element 140 and the optical axis is Y42.

Preferred embodiments of the present invention will be described in the following paragraphs by referring to the accompanying drawings.

Figure 1B:
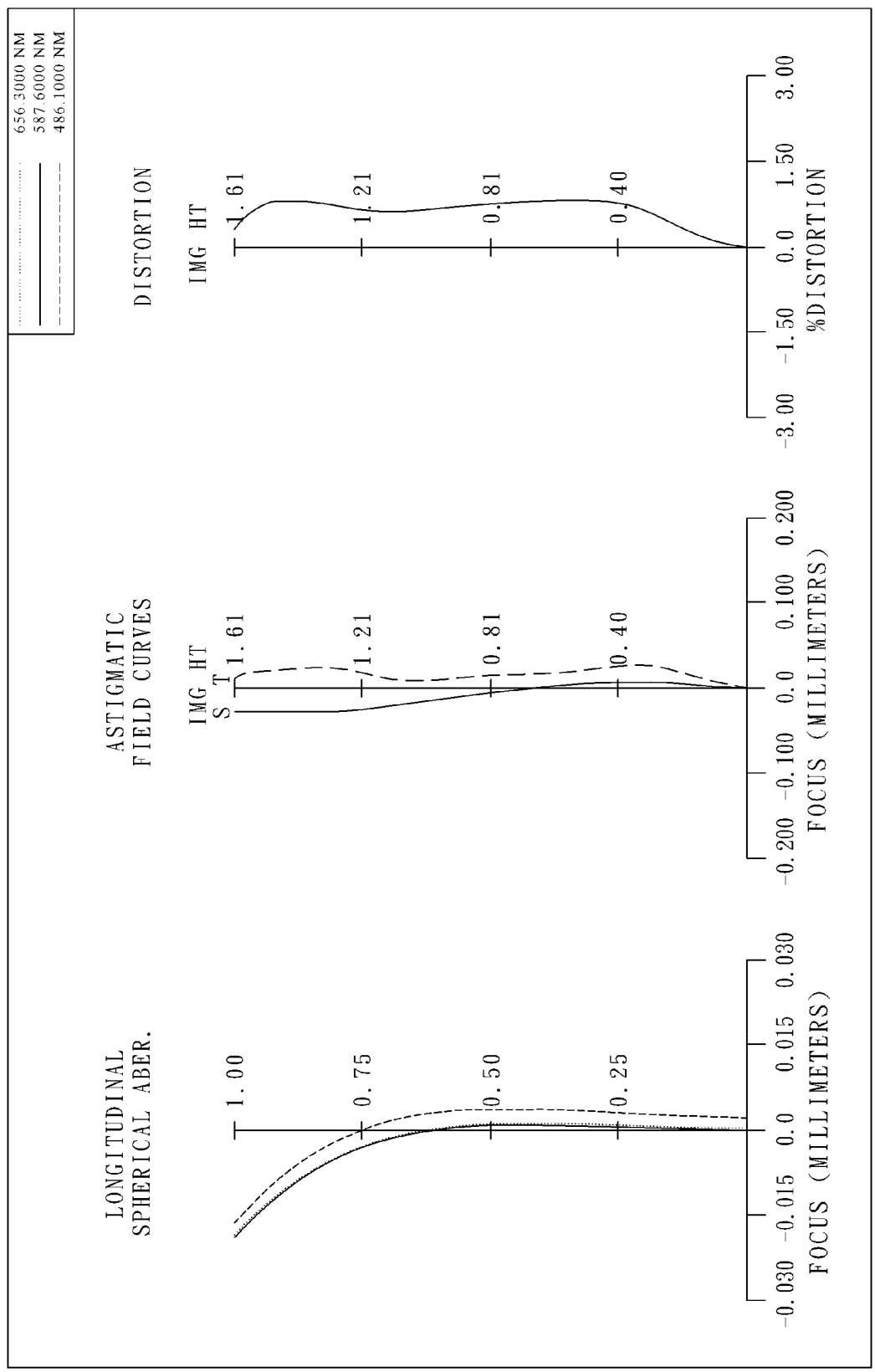
FIG. 1B shows the aberration curves of the first embodiment of the present invention.

FIG. 1A shows an image pick-up optical lens assembly in accordance with the first embodiment of the present invention, and FIG. 1B shows the aberration curves of the first embodiment of the present invention. In the first embodiment of the present invention, there is an image pick-up optical lens assembly mainly comprising four lens elements, in order from an object side to an image side: a plastic first lens element 110 with positive refractive power having a convex object-side surface 111 and a convex image-side surface 112; a plastic second lens element 120 with negative refractive power having a concave object-side surface 121 and a convex image-side surface 122; a plastic third lens element 130 with positive refractive power having a concave object-side surface 131 and a convex image-side surface 132, both surfaces 131 and 132 thereof being aspheric; and a plastic fourth lens element 140 with negative refractive power having a convex object-side surface 141 and a concave image-side surface 142, both surfaces 141 and 142 thereof being aspheric and at least one of which being provided with at least one inflection point. The image pick-up optical lens assembly is also provided with an aperture stop 100 disposed between an object and the first lens element 110. The image pick-up optical lens assembly further comprises an IR-filter 150 disposed between the image-side surface 142 of the fourth lens element 140 and an image plane 160; the IR-filter 150 is made of glass and has no influence on the focal length of the image pick-up optical lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present image pick-up optical lens assembly, the focal length of the image pick-up optical lens assembly is f, and it satisfies the relation: f=2.11 (mm).

In the first embodiment of the present image pick-up optical lens assembly, the f-number of the image pick-up optical lens assembly is Fno, and it satisfies the relation: Fno=2.07.

In the first embodiment of the present image pick-up optical lens assembly, half of the maximal field of view of the image pick-up optical lens assembly is HFOV, and it satisfies the relation: HFOV=37.4 (degrees).

In the first embodiment of the present image pick-up optical lens assembly, the Abbe number of the first lens element 110 is V1, the Abbe number of the second lens element 120 is V2, and they satisfy the relation: V1−V2=32.1.

In the first embodiment of the present image pick-up optical lens assembly, the refractive index of the first lens element 110 is N1, the refractive index of the second lens element 120 is N2, and they satisfy the relation: |N1−N2|=0.090.

In the first embodiment of the present image pick-up optical lens assembly, the radius of curvature of the image-side surface 112 of the first lens element 110 is R2, the radius of curvature of the object-side surface 121 of the second lens element 120 is R3, and they satisfy the relation: R2/R3=1.37.

In the first embodiment of the present image pick-up optical lens assembly, the radius of curvature of the object-side surface 111 of the first lens element 110 is R1, the radius of curvature of the image-side surface 112 of the first lens element 110 is R2, and they satisfy the relation: (R1+R2)/(R1−R2)=0.42.

In the first embodiment of the present image pick-up optical lens assembly, the radius of curvature of the object-side surface 121 of the second lens element 120 is R3, the radius of curvature of the image-side surface 122 of the second lens element 120 is R4, and they satisfy the relation: (R3−FR4)/(R3−R4)=−1.52.

In the first embodiment of the present image pick-up optical lens assembly, the focal length of the first lens element 110 is f1, the focal length of the second lens element 120 is f2, and they satisfy the relation: f1/f2=−0.94.

In the first embodiment of the present image pick-up optical lens assembly, the focal length of the second lens element 120 is f2, the focal length of the fourth lens element 140 is f4, and they satisfy the relation: f2/f4=0.24.

In the first embodiment of the present image pick-up optical lens assembly, the distance on the optical axis between the first lens element 110 and the second lens element 120 is T12, the focal length of the image pick-up optical lens assembly is f, and they satisfy the relation: T12/f=0.09.

In the first embodiment of the present image pick-up optical lens assembly, the focal length of the image pick-up optical lens assembly is f, the focal length of the second lens element 120 is f2, the focal length of the third lens element 130 is f3, the focal length of the fourth lens element 140 is f4, and they satisfy the relation:

$$\frac{(f/f_2) + (f/f_3)}{f/f_4} = 0.73.$$

In the first embodiment of the present image pick-up optical lens assembly, the combined thickness of the first, second, third and fourth lens elements 110, 120, 130 and 140 on the optical axis is ΣCT, the distance on the optical axis between the object-side surface 111 of the first lens element 110 and the image-side surface 142 of the fourth lens element 140 is Td, and they satisfy the relation:

$$\frac{\Sigma CT}{Td} = 0.90.$$

In the first embodiment of the present image pick-up optical lens assembly, the effective radius of the object-side surface 111 of the first lens element 110 is Y11, the effective radius of the image-side surface 142 of the fourth lens element 140 is Y42, and they satisfy the relation: Y11/Y42=0.49.

In the first embodiment of the present image pick-up optical lens assembly, the distance on the optical axis between the aperture stop 100 and the image plane 160 is SL, the distance on the optical axis between the object-side surface 111 of the first lens element 110 and the image plane 160 is TTL, and they satisfy the relation: SL/TTL=1.06.

In the first embodiment of the present image pick-up optical lens assembly, the image pick-up optical lens assembly further comprises an image sensor disposed on the image plane 160. The distance on the optical axis between the object-side surface 111 of the first lens element 110 and the image plane 160 is TTL, half of the diagonal length of the effective photo-sensitive area of the image sensor is ImgH, and they satisfy the relation: TTL/ImgH=2.21.

The detailed optical data of the first embodiment is shown in FIG. 4 (TABLE 1), and the aspheric surface data is shown in FIG. 5 (TABLE 2), wherein the units of the radius of curvature, the thickness and the focal length are expressed in mm, and HFOV is half of the maximal field of view.

Figure 2A:
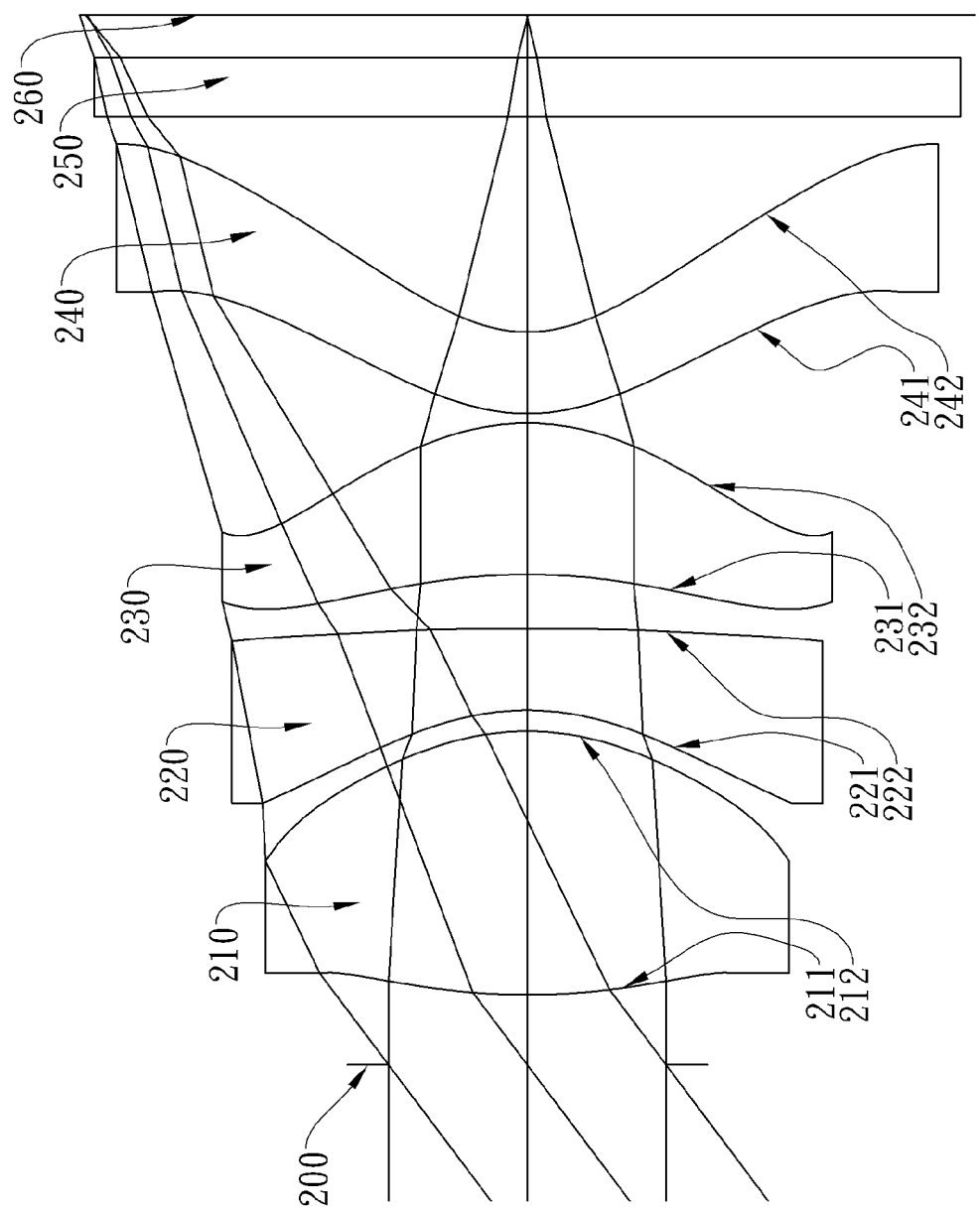
FIG. 2A shows an image pick-up optical lens assembly in accordance with a second embodiment of the present invention.
Figure 2B:
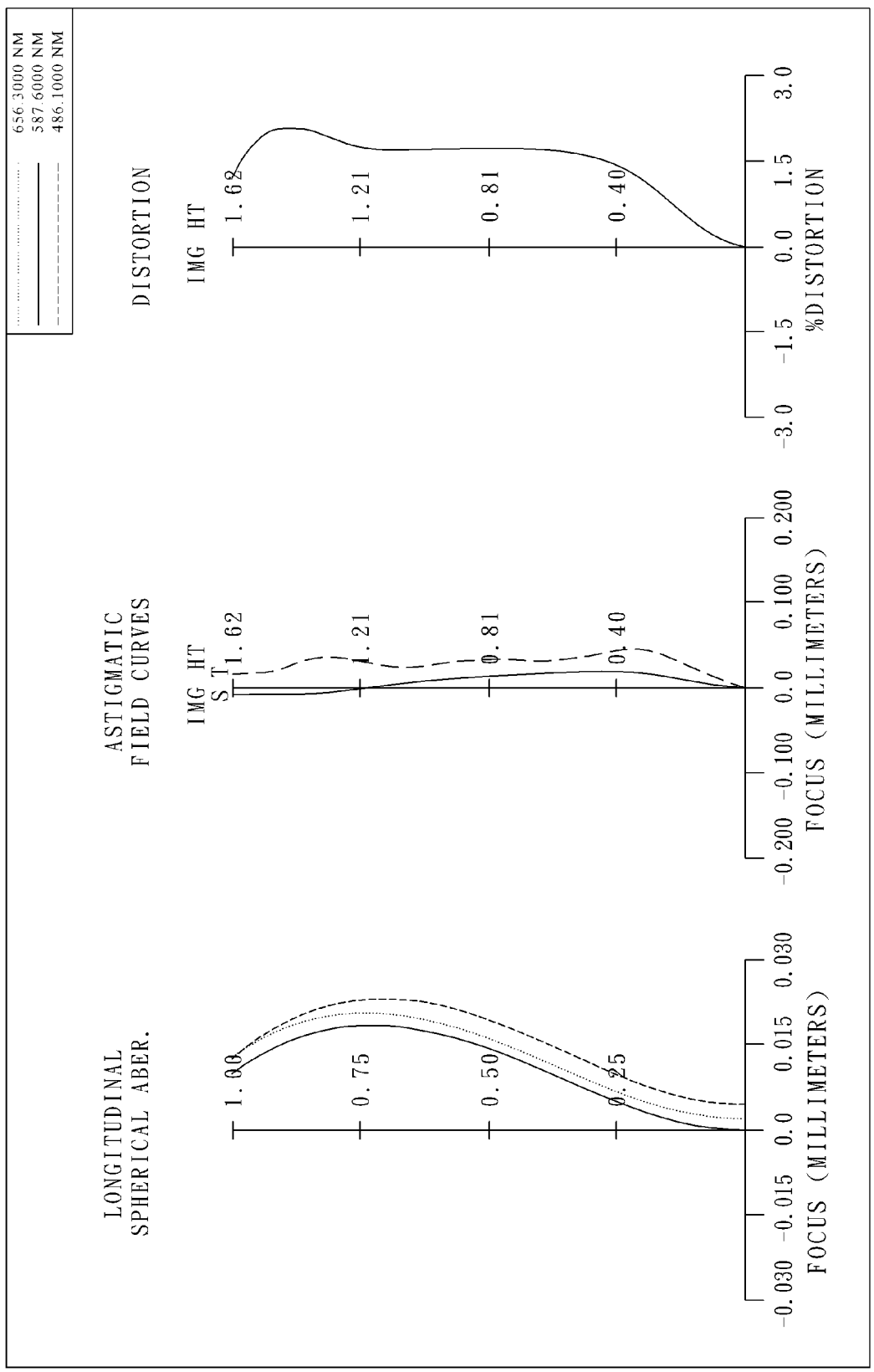
FIG. 2B shows the aberration curves of the second embodiment of the present invention.

FIG. 2A shows an image pick-up optical lens assembly in accordance with a second embodiment of the present invention, and FIG. 2B shows the aberration curves of the second embodiment of the present invention. In the second embodiment of the present invention, there is an image pick-up optical lens assembly mainly comprising four lens elements, in order from an object side to an image side: a plastic first lens element 210 with positive refractive power having a convex object-side surface 211 and a convex image-side surface 212; a plastic second lens element 220 with negative refractive power having a concave object-side surface 221 and a convex image-side surface 222; a plastic third lens element 230 with positive refractive power having a concave object-side surface 231 and a convex image-side surface 232, both surfaces 231 and 232 thereof being aspheric; and a plastic fourth lens element 240 with negative refractive power having a convex object-side surface 241 and a concave image-side surface 242, both surfaces 241 and 242 thereof being aspheric and at least one of which being provided with at least one inflection point. The image pick-up optical lens assembly is also provided with an aperture stop 200 disposed between an object and the first lens element 210. The image pick-up optical lens assembly further comprises an IR-filter 250 disposed between the image-side surface 242 of the fourth lens element 240 and an image plane 260; the IR-filter 250 is made of glass and has no influence on the focal length of the image pick-up optical lens assembly.

The equation of the aspheric surface profiles of the second embodiment has the same form as that of the first embodiment.

In the second embodiment of the present image pick-up optical lens assembly, the focal length of the image pick-up optical lens assembly is f, and it satisfies the relation: f=2.12 (mm).

In the second embodiment of the present image pick-up optical lens assembly, the f-number of the image pick-up optical lens assembly is Fno, and it satisfies the relation: Fno=2.07.

In the second embodiment of the present image pick-up optical lens assembly, half of the maximal field of view of the image pick-up optical lens assembly is HFOV, and it satisfies the relation: HFOV=36.9 (degrees).

In the second embodiment of the present image pick-up optical lens assembly, the Abbe number of the first lens element 210 is V1, the Abbe number of the second lens element 220 is V2, and they satisfy the relation: V1−V2=35.1.

In the second embodiment of the present image pick-up optical lens assembly, the refractive index of the first lens element 210 is N1, the refractive index of the second lens element 220 is N2, and they satisfy the relation: |N1−N2|=0.107.

In the second embodiment of the present image pick-up optical lens assembly, the radius of curvature of the image-side surface 212 of the first lens element 210 is R2, the radius of curvature of the object-side surface 221 of the second lens element 220 is R3, and they satisfy the relation: R2/R3=0.98.

In the second embodiment of the present image pick-up optical lens assembly, the radius of curvature of the object-side surface 211 of the first lens element 210 is R1, the radius of curvature of the image-side surface 212 of the first lens element 210 is R2, and they satisfy the relation: (R1+R2)/(R1−R2)=0.41.

In the second embodiment of the present image pick-up optical lens assembly, the radius of curvature of the object-side surface 221 of the second lens element 220 is R3, the radius of curvature of the image-side surface 222 of the second lens element 220 is R4, and they satisfy the relation: (R3+R4)/(R3−R4)=−1.07.

In the second embodiment of the present image pick-up optical lens assembly, the focal length of the first lens element 210 is f1, the focal length of the second lens element 220 is f2, and they satisfy the relation: f1/f2=−0.88.

In the second embodiment of the present image pick-up optical lens assembly, the focal length of the second lens element 220 is f2, the focal length of the fourth lens element 240 is f4, and they satisfy the relation: f2/f4=0.28.

In the second embodiment of the present image pick-up optical lens assembly, the distance on the optical axis between the first lens element 210 and the second lens element 220 is T12, the focal length of the image pick-up optical lens assembly is f, and they satisfy the relation: T12/f=0.04.

In the second embodiment of the present image pick-up optical lens assembly, the focal length of the image pick-up optical lens assembly is f, the focal length of the second lens element 220 is f2, the focal length of the third lens element 230 is f3, the focal length of the fourth lens element 240 is f4, and they satisfy the relation:

$$\frac{(f/f_2)+(f/f_3)}{f/f_4}=0.92.$$

In the second embodiment of the present image pick-up optical lens assembly, the combined thickness of the first, second, third and fourth lens elements 210, 220, 230 and 240 on the optical axis is ΣCT, the distance on the optical axis between the object-side surface 211 of the first lens element 210 and the image-side surface 242 of the fourth lens element 240 is Td, and they satisfy the relation:

$$\frac{\Sigma CT}{Td}=0.87.$$

In the second embodiment of the present image pick-up optical lens assembly, the effective radius of the object-side surface 211 of the first lens element 210 is Y11, the effective radius of the image-side surface 242 of the fourth lens element 240 is Y42, and they satisfy the relation: Y11/Y42=0.51.

In the second embodiment of the present image pick-up optical lens assembly, the distance on the optical axis between the aperture stop 200 and the image plane 260 is SL, the distance on the optical axis between the object-side surface 211 of the first lens element 210 and the image plane 260 is TTL, and they satisfy the relation: SL/TTL=1.07.

In the second embodiment of the present image pick-up optical lens assembly, the image pick-up optical lens assembly further comprises an image sensor disposed on the image plane 260. The distance on the optical axis between the object-side surface 211 of the first lens element 210 and the image plane 260 is TTL, half of the diagonal length of the effective photo-sensitive area of the image sensor is ImgH, and they satisfy the relation: TTL/ImgH=2.18.

The detailed optical data of the second embodiment is shown in FIG. 6 (TABLE 3), and the aspheric surface data is shown in FIG. 7 (TABLE 4), wherein the units of the radius of curvature, the thickness and the focal length are expressed in mm, and HFOV is half of the maximal field of view.

Figure 3A:
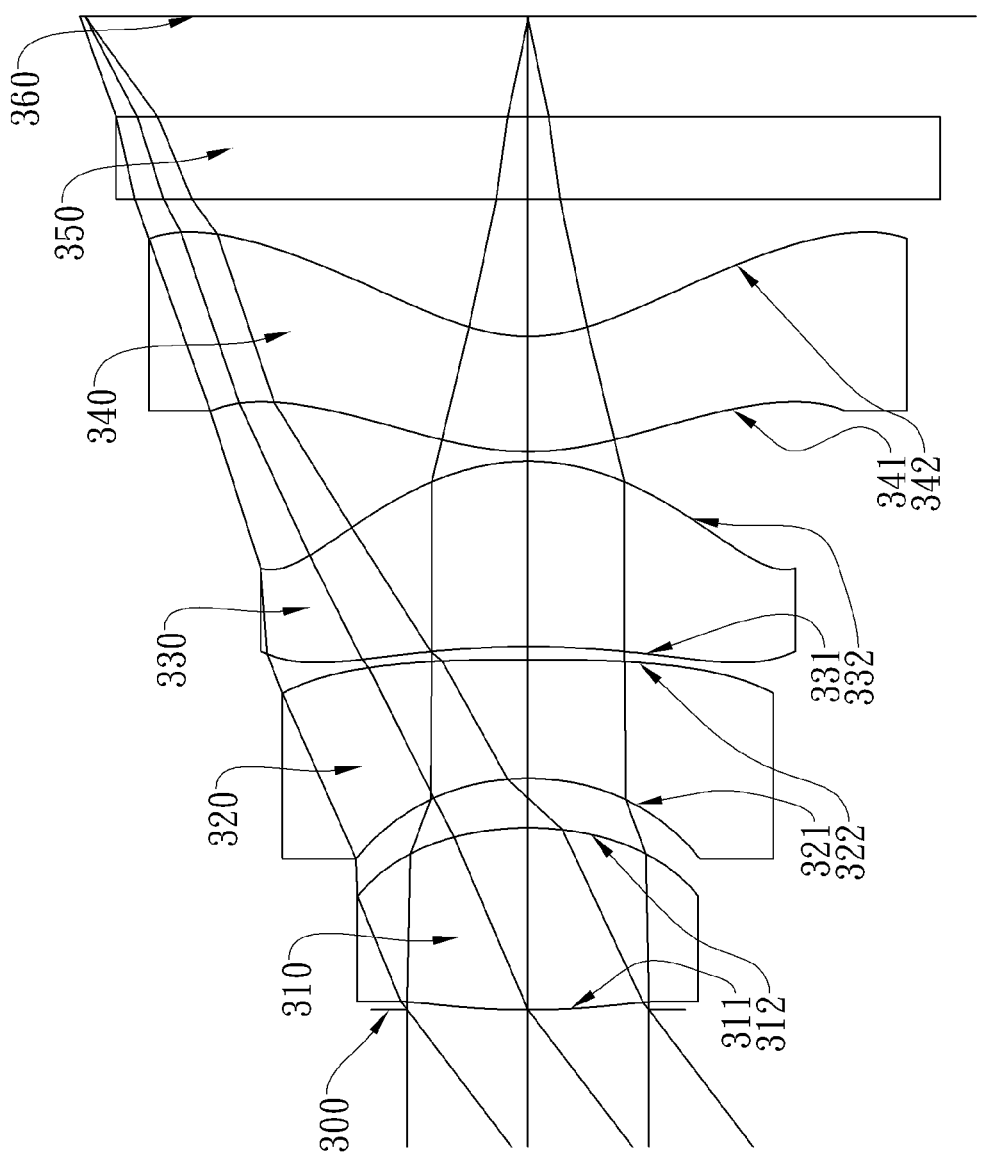
FIG. 3A shows an image pick-up optical lens assembly in accordance with a third embodiment of the present invention.
Figure 3B:
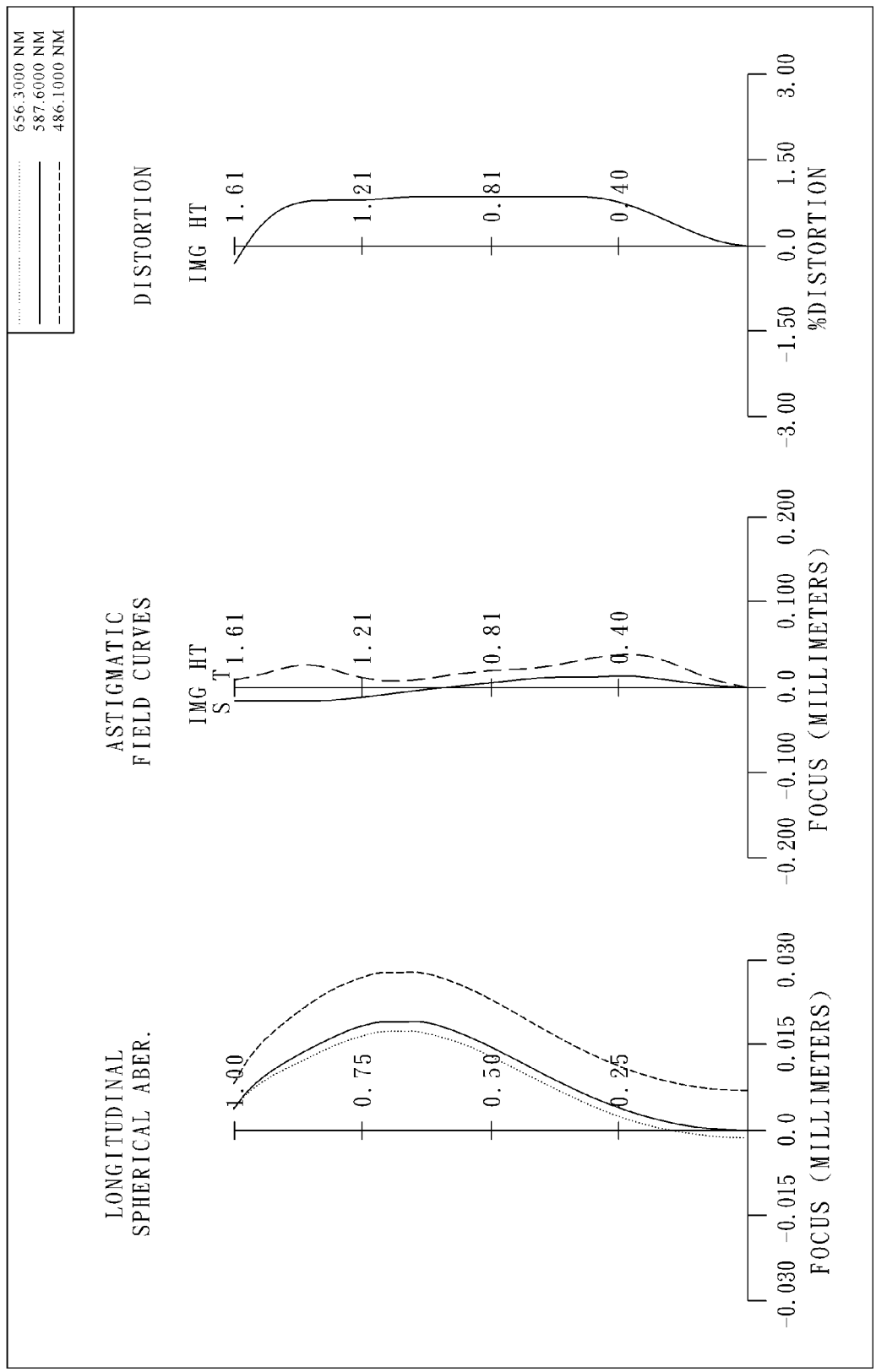
FIG. 3B shows the aberration curves of the third embodiment of the present invention.

FIG. 3A shows an image pick-up optical lens assembly in accordance with a third embodiment of the present invention, and FIG. 3B shows the aberration curves of the third embodiment of the present invention. In the third embodiment of the present invention, there is an image pick-up optical lens assembly mainly comprising four lens elements, in order from an object side to an image side: a plastic first lens element 310 with positive refractive power having a convex object-side surface 311 and a convex image-side surface 312; a plastic second lens element 320 with negative refractive power having a concave object-side surface 321 and a convex image-side surface 322; a plastic third lens element 330 with positive refractive power having a concave object-side surface 331 and a convex image-side surface 332, both surfaces 331 and 332 thereof being aspheric; and a plastic fourth lens element 340 with negative refractive power having a convex object-side surface 341 and a concave image-side surface 342, both surfaces 341 and 342 thereof being aspheric and at least one of which being provided with at least one inflection point. The image pick-up optical lens assembly is also provided with an aperture stop 300 disposed between an object and the first lens element 310. The image pick-up optical lens assembly further comprises an IR-filter 350 disposed between the image-side surface 342 of the fourth lens element 340 and an image plane 360; the IR-filter 350 is made of glass and has no influence on the focal length of the image pick-up optical lens assembly.

The equation of the aspheric surface profiles of the third embodiment has the same form as that of the first embodiment.

In the third embodiment of the present image pick-up optical lens assembly, the focal length of the image pick-up optical lens assembly is f, and it satisfies the relation: f=2.13 (mm).

In the third embodiment of the present image pick-up optical lens assembly, the f-number of the image pick-up optical lens assembly is Fno, and it satisfies the relation: Fno=2.40.

In the third embodiment of the present image pick-up optical lens assembly, half of the maximal field of view of the image pick-up optical lens assembly is HFOV, and it satisfies the relation: HFOV=37.3 (degrees).

In the third embodiment of the present image pick-up optical lens assembly, the Abbe number of the first lens element 310 is V1, the Abbe number of the second lens element 320 is V2, and they satisfy the relation: V1−V2=32.5.

In the third embodiment of the present image pick-up optical lens assembly, the refractive index of the first lens element 310 is N1, the refractive index of the second lens element 320 is N2, and they satisfy the relation: |N1−N2|=0.089.

In the third embodiment of the present image pick-up optical lens assembly, the radius of curvature of the image-side surface 312 of the first lens element 310 is R2, the radius of curvature of the object-side surface 321 of the second lens element 320 is R3, and they satisfy the relation: R2/R3=1.25.

In the third embodiment of the present image pick-up optical lens assembly, the radius of curvature of the object-side surface 311 of the first lens element 310 is R1, the radius of curvature of the image-side surface 312 of the first lens element 310 is R2, and they satisfy the relation: (R1+R2)/(R1−R2)=0.38.

In the third embodiment of the present image pick-up optical lens assembly, the radius of curvature of the object-side surface 321 of the second lens element 320 is R3, the radius of curvature of the image-side surface 322 of the second lens element 320 is R4, and they satisfy the relation: (R3+R4)/(R3−R4)=−1.13.

In the third embodiment of the present image pick-up optical lens assembly, the focal length of the first lens element 310 is f1, the focal length of the second lens element 320 is f2, and they satisfy the relation: f1/f2=−0.99.

In the third embodiment of the present image pick-up optical lens assembly, the focal length of the second lens element 320 is f2, the focal length of the fourth lens element 340 is f4, and they satisfy the relation: f2/f4=0.31.

In the third embodiment of the present image pick-up optical lens assembly, the distance on the optical axis between the first lens element 310 and the second lens element 320 is T12, the focal length of the image pick-up optical lens assembly is f, and they satisfy the relation: T12/f=0.08.

In the third embodiment of the present image pick-up optical lens assembly, the focal length of the image pick-up optical lens assembly is f, the focal length of the second lens element 320 is f2, the focal length of the third lens element 330 is f3, the focal length of the fourth lens element 340 is f4, and they satisfy the relation:

$$\frac{(f/f_2)+(f/f_3)}{f/f_4}=0.49.$$

In the third embodiment of the present image pick-up optical lens assembly, the combined thickness of the first, second, third and fourth lens elements 310, 320, 330 and 340 on the optical axis is ΣCT, the distance on the optical axis between the object-side surface 311 of the first lens element 310 and the image-side surface 342 of the fourth lens element 340 is Td, and they satisfy the relation:

$$\frac{\Sigma CT}{Td}=0.89.$$

In the third embodiment of the present image pick-up optical lens assembly, the effective radius of the object-side surface 311 of the first lens element 310 is Y11, the effective radius of the image-side surface 342 of the fourth lens element 340 is Y42, and they satisfy the relation: Y11/Y42=0.34.

In the third embodiment of the present image pick-up optical lens assembly, the distance on the optical axis between the aperture stop 300 and the image plane 360 is SL, the distance on the optical axis between the object-side surface 311 of the first lens element 310 and the image plane 360 is TTL, and they satisfy the relation: SL/TTL=1.00.

In the third embodiment of the present image pick-up optical lens assembly, the image pick-up optical lens assembly further comprises an image sensor disposed on the image plane 360. The distance on the optical axis between the object-side surface 311 of the first lens element 310 and the image plane 360 is TTL, half of the diagonal length of the effective photo-sensitive area of the image sensor is ImgH, and they satisfy the relation: TTL/ImgH=2.18.

The detailed optical data of the third embodiment is shown in FIG. 8 (TABLE 5), and the aspheric surface data is shown in FIG. 9 (TABLE 6), wherein the units of the radius of curvature, the thickness and the focal length are expressed in mm, and HFOV is half of the maximal field of view.

It is to be noted that TABLES 1-6 (illustrated in FIGS. 4-9 respectively) show different data of the different embodiments, however, the data of the different embodiments are obtained from experiments. Therefore, any image pick-up optical lens assembly of the same structure is considered to be within the scope of the present invention even if it uses different data. The embodiments depicted above and the appended drawings are exemplary and are not intended to limit the scope of the present invention. TABLE 7 (illustrated in FIG. 10) shows the data of the respective embodiments resulting from the equations.

What is claimed is:

1. An image pick-up optical lens assembly comprising, in order from an object side to an image side:
   a first lens element with positive refractive power having a convex object-side surface and a convex image-side surface;
   a second lens element with negative refractive power having a concave object-side surface and a convex image-side surface;
   a third lens element with positive refractive power having an object-side surface and a convex image-side surface, at least one of the surfaces thereof being aspheric; and
   a fourth lens element with negative refractive power having a convex object-side surface and a concave image-side surface, at least one of the surfaces thereof being aspheric;
   wherein the image pick-up optical lens assembly further comprises an aperture stop disposed between an object and the first lens element; wherein the number of lens elements with refractive power is four; and wherein a combined thickness of the lens elements with refractive power on an optical axis is $$\frac{\Sigma CT}{Td},$$

a distance on the optical axis between the object-side surface of the first lens element and the image-side surface of the fourth lens element is Td, a radius of curvature of the object-side surface of the first lens element is R1, a radius of curvature of the image-side surface of the first lens element is R2, a focal length of the image pick-up optical lens assembly is f, a focal length of the second lens element is f2, a focal length of the third lens element is f3, a focal length of the fourth lens element is f4, a distance on the optical axis between the first lens element and the second lens element is T12, and they satisfy the relations:

$$0.80 < \frac{\Sigma CT}{Td} < 0.98;\ 0.15 < (R1+R2)/(R1-R2) < 1.0;$$

$$0.4 < \frac{(f/f_2)+(f/f_3)}{f/f_4} < 1.7;\ \text{and}\ 0.0 < T12/f < 0.10.$$

2. The image pick-up optical lens assembly according to claim 1, wherein the fourth lens element is made of plastic material and at least one of the surfaces thereof is provided with at least one inflection point.

3. The image pick-up optical lens assembly according to claim 2, wherein the object-side surface of the third lens element is concave.

4. The image pick-up optical lens assembly according to claim 3 further comprising an image sensor disposed on an image plane for image formation of the object, wherein a distance on the optical axis between the aperture stop and the image plane is SL, a distance on the optical axis between the object-side surface of the first lens element and the image plane is TTL, and they satisfy the relation: 0.90<SL/TTL<1.20.

5. The image pick-up optical lens assembly according to claim 4, wherein the focal length of the second lens element is f2, the focal length of the fourth lens element is f4, and they satisfy the relation: 0.15<f2/f4<0.45.

6. The image pick-up optical lens assembly according to claim 4, wherein a refractive index of the first lens element is N1, a refractive index of the second lens element is N2, and they satisfy the relation: |N1−N2|<0.12.

7. The image pick-up optical lens assembly according to claim 4, wherein an effective radius of the object-side surface of the first lens element is Y11, an effective radius of the image-side surface of the fourth lens element is Y42, and they satisfy the relation: 0.4<Y11/Y42<0.7.

8. The image pick-up optical lens assembly according to claim 4, wherein an Abbe number of the first lens element is V1, an Abbe number of the second lens element is V2, and they satisfy the relation: 30<V1−V2<45.

9. The image pick-up optical lens assembly according to claim 4, wherein the radius of curvature of the image-side surface of the first lens element is R2, the radius of curvature of the object-side surface of the second lens element is R3, and they satisfy the relation: 0.85<R2/R3<1.45.

10. The image pick-up optical lens assembly according to claim 4, wherein the focal length of the image pick-up optical lens assembly is f, the focal length of the second lens element is f2, the focal length of the third lens element is f3, the focal length of the fourth lens element is f4, and they satisfy the relation:

$$0.5 < \frac{(f/f_2)+(f/f_3)}{f/f_4} < 1.2.$$

11. The image pick-up optical lens assembly according to claim 2, wherein the combined thickness of the lens elements with refractive power on the optical axis is ΣCT, the distance on the optical axis between the object-side surface of the first lens element and the image-side surface of the fourth lens element is Td, and they satisfy the relation:

$$0.86 < \frac{\Sigma CT}{Td} < 0.94.$$

12. The image pick-up optical lens assembly according to claim 2, wherein the radius of curvature of the object-side surface of the first lens element is R1, the radius of curvature of the image-side surface of the first lens element is R2, and they satisfy the relation: 0.3<(R1+R2)/(R1−R2)<0.5.

13. The image pick-up optical lens assembly according to claim 2, wherein a radius of curvature of the object-side surface of the second lens element is R3, a radius of curvature of the image-side surface of the second lens element is R4, and they satisfy the relation: −2.0<(R3+R4)/(R3−R4)<−1.0.

14. The image pick-up optical lens assembly according to claim 2, wherein a focal length of the first lens element is f1, the focal length of the second lens element is f2, and they satisfy the relation: −1.2<f1/f2<−0.8.

15. The image pick-up optical lens assembly according to claim 2, wherein the distance on the optical axis between the object-side surface of the first lens element and the image plane is TTL, half of a diagonal length of an effective photosensitive area of the image sensor is ImgH, and they satisfy the relation: TTL/ImgH<2.4.

* * * * *